Dec. 26, 1961    W. C. COTTONGIM    3,014,770
AIR CIRCULATING FAN
Filed May 5, 1958

INVENTOR:
WILLARD C. COTTONGIM
BY:
ATTORNEY

United States Patent Office 3,014,770
Patented Dec. 26, 1961

3,014,770
AIR CIRCULATING FAN
Willard Clinton Cottongim, 742 Andover Drive NW.,
Atlanta, Ga.
Filed May 5, 1958, Ser. No. 733,027
6 Claims. (Cl. 308—245)

This invention relates to air circulating fans, and is particularly concerned with the mounting, assembly and bearing constructions of motor fans of the belt driven type.

An increasing demand for heavy duty, belt driven fans, frequently referred to as attic fans, has called for increasing simplicity of structure and economy of design to provide such devices within a price range amenable to the modest income of middle class home owners. In order to meet these requirements, simple, stamped overall frames have been developed with a central opening defining integral venturi edges to maintain high efficiency without undue cost. With such structures, problems arise with respect to the fan mounting and the provision of simple and inexpensive bearing structures for adequately supporting the fan shaft from the frame. The present invention is primarily concerned with the provision of bearing housings and the retention and support thereof from the conventional integral overall frames of the type referred to.

The present invention achieves economy of manufacture without sacrifice of strength, durability and rigidity, in part by providing a bearing housing for enclosing and supporting the fan shaft which may be defined as a multi-part housing preferably formed with interengaging flanges to facilitate assembly and provide rigidity of construction. The individual parts may be simply and economically formed as metal stamps and are here illustrated as two in number, each generally semi-circular in cross section. Radially flared mouth flanges at the opposite ends of the bearing members provide appropriately spaced cylindrical seats for spaced shaft bearings, preferably mounted in encircling resilient supporting rings. The central portion of the housing formed by the union of the upper and lower housing elements is enlarged to provide substantial bearing and engaging seats for the reception of upper and lower supporting brackets. Economy of manufacture without sacrifice of strength, durability and rigidity is further achieved by the unique construction and securement of such upper and lower supporting brackets, the centers of which may be conveniently bolted to the housing to extend radially outward therefrom to engage equidistant circularly spaced areas of the peripheral overall frame.

It is therefore among the objects of the present invention to provide a novel, simple and improved motor mounting and bearing housing for heavy duty motor driven fans.

Another object of the invention is to provide an improved multi-part bearing housing which may be economically manufactured, readily assembled, and permanently secured as a rigid integral structure.

It is also an object of the invention to provide novel and improved mounting means for the bearing housing of the shafts of motor fans, whereby the bearing housing may be economically and rigidly secured to an overall fan frame.

A further object of the invention is to provide a novel combination of bearing housing structure and housing support means for a simple, effective, vibration free mounting of a motor fan shaft from a peripheral overall fan frame.

Other objects of the present invention relate to details of construction, assembly, and the interrelation of parts to the end that there is provided a highly economical fan assembly of superior rigidity, durability and facility of manufacture and assembly.

Other objects and features of the present invention will be apparent from consideration of the following specification taken in conjunction with the accompanying drawing, in which.

Figures 1, 2, 3:
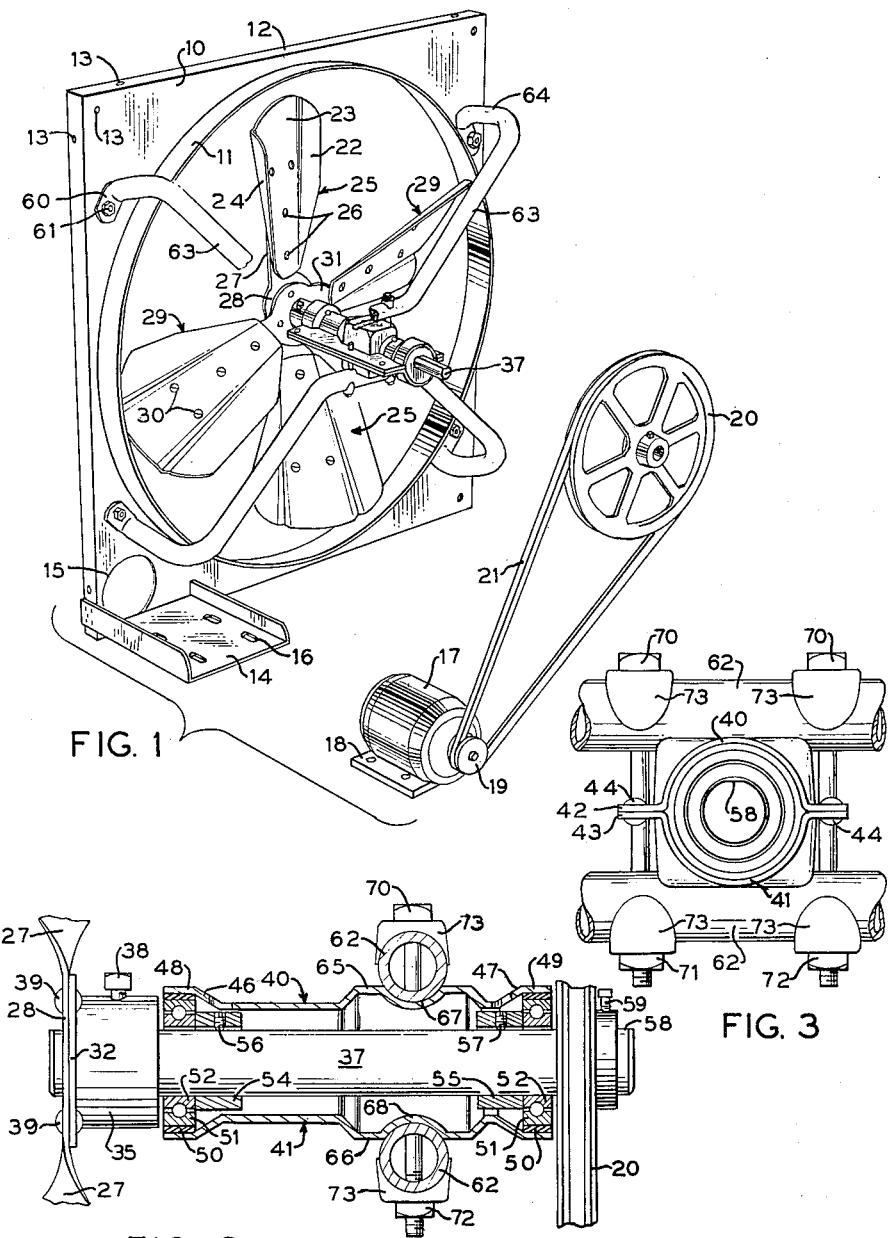
FIG. 1 is a perspective exploded view of a motor driven fan formed in accordance with the present invention.
FIG. 2 is a longitudinal vertical cross section of the motor shaft and bearing housing assembly.
FIG. 3 is an end elevation of the bearing assembly with the pulley removed therefrom.

In that form of the invention here shown by way of example, the overall fan frame is shown as generally rectangular in outline. The frame, preferably formed by stamping from a single sheet, includes a generally flat rectangular peripheral plate 10 defining a central circular opening bounded by an inwardly curving lip 11 forming a venturi, the axis of which coincides with that of the fan, providing for an effect of efficient and economic operation of the device. Additionally, the integral lip 11 will materially strengthen the body plate 10 and lend rigidity thereto. Strength and rigidity are also increased by the provision of oppositely extending peripheral edge flanges 12 which also provide an effective edge thickness for the mounting of the frame. Suitable securing apertures, as indicated at 13, may be provided to facilitate various types of securement for the frame. In the present form of frame, a motor bracket 14 is provided at the lower lefthand side of the frame as shown in FIG. 1. The bracket 14 extends outward from the frame in a plane normal to the plate 10, being welded or otherwise permanently affixed to the frame adjacent a circular aperture 15 provided to receive the forward extension of a motor if required and one to receive motor cables therethrough. The bracket 14 is provided with elongate bolt receiving apertures 16 for the adjustable reception of motor securing bolts, the arrangement being such that the motor, as indicated at 17, may be bolted by its base 18 to the bracket, the adjustment providing for the alignment of a motor pulley 19 with a fan shaft pulley 20 to be driven through a conventional belt 21. The fan here shown is in vertical position for horizontal air flow; however, the construction readily admits of a horizontal disposition of the frame for vertical air flow.

The blades of the fan are here shown as of shovel type configuration, being formed with only slightly tilted leading edge sections 22, more angularly inclined central sections 23, and still more radically inclined trailing edge sections 24. In this form of the fan, opposite blades 25 are rigidly secured, as by rivets 26, to oppositely extending blade arms 27 radiating from a blade disk 28. The opposed intermediate blades 29 are secured by rivets 30 to oppositely extending blade arms 31 of a flange 32 on the periphery of a hub 35. The hub is secured for rotation with the fan shaft 37 by threaded set screw 38. The disk 28 is rigidly secured, as by rivets 39, or the like, to the flange 32 of the hub 35, each arm being right angularly extending with respect to its next adjacent arm. The arrangement is such that as the fan blades are rotated in unison within the opening of the frame air is drawn through the venturi opening formed by the lip 11.

The fan shaft 37 is mounted within a bearing housing formed from a pair of semi-cylindrical housing elements 40 and 41, respectively. The elements 40 and 41 are permanently joined to form the generally cylindrical housing by the provision of side flanges 42 and 43, respectively, united by rivets 44 or the equivalent. The fan end and the pulley end of the housing are formed with outwardly tapering bell mouths 46 and 47, respectively terminating in open cylindrical end bearing retaining rims 48 and 49. Seated within the rims 48 and 49 there are provided annular cushion rings 50 of rubber or the like which seat the outer races 51 of the front and rear shaft bearings. Companion inner bearing races 52 are mounted on the fan end and pulley end of the fan shaft 37. The fan shaft 37 is held longitudinally fixed within the bearing housing by stop collars 54 and 55 abutting the inner races 52 of the fan end bearing and the pulley end bearing, respectively. Collars 54 and 55 are secured against longitudinal movement with respect to shaft 37 and for rotation therewith by their set screws 56 and 57 engaging a longitudinal flat surface 58 of the shaft 37, as shown in FIG. 3. The surface 58 also assists in the securement of the pulley 50 by its set screw 59.

By this arrangement it will be seen that the fan shaft is suitably retained for rotation within the bearing housing, and that it is supported by spaced bearings at each end of the housing which are seated in resilient mountings to preclude vibration transmittal to the frame by rotation of the shaft. It will also be noted that stop collars 54 and 55 provide adequate means for precluding longitudinal movement of the shaft within the housing. It will be noted that the shaft 37 protrudes from the housing at each end to receive the fan hub 35 at one end and the drive pulley 20 at the other.

For mounting the bearing housing, hence the fan shaft, fan and pulley, from the plate 10 of the overall frame, upper and lower, preferably, mounting brackets are provided. The frame ends of the brackets are preferably flattened and turned to form feet 60 lying parallel with plate 10 to which they are secured by bolt connections 61. Each bracket is formed with a central straight portion 62 which engages the bearing housing, and outwardly diverging radial side legs 63, the ends of which turn forwardly as at 64 to be formed into the feet 60. As illustrated in FIG. 1, the upper and lower brackets are arranged to dispose their central straight sections 62 in vertically spaced, horizontal, parallel relation with the feet 60 attached to plate 10. To receive the portions 62 of the brackets 60 for mounting the bearing housing therebetween, the intermediate portion of the housing is formed as an enlarged transversely rectangular mounting sector. The sector is formed with flat upper and lower surfaces 65 and 66 which are transversely recessed, as at 67 and 68, respectively, with a curvature conforming to the outside diameter of central sections 62 of the brackets. Thus there are provided extended bracket receiving surfaces within which the central portion 62 of the brackets are seated to retain the housing in fixed position supported by the frame. The brackets are secured to the housing, to preclude relative displacement, by vertical securing bolts 70 on each side of the housing which extend through the central portion 62 of the brackets. Bolts 70 pass through the flanges 42 and 43 of the upper and lower housing elements of the housing 41 and 42. Each bolt extends from the lower bracket through the flange to the upper bracket and is secured by nuts 71 and 72. Inwardly of the heads and nuts, escutcheon members 73 engage the brackets to insure an extended semi-circular pressure surface on either side of the housing.

By this arrangement, it will be seen that the supporting brackets are rigidly secured at their outer ends to the frame, and they extend radially inwardly to dispose their central portions in vertically spaced parallel relation. These central portions engage the upper and lower recesses of the flat surfaces of the enlarged housing section and are secured through the bolts 70 which extend through the flanges and the brackets. Thus a rigid support of the housing centrally of the aperture of the frame is provided. The fastening of the brackets by bolts which extend through the flanges of the housing elements not only provides effective securing pressure by the escutcheons, but further aids in precluding any tilting movement between the housing and the brackets and relieves some of the stress on the rivets 44 by urging the housing elements 40 together. The tubular formation of the brackets provides maximum strength and rigidity with minimum weight and material, as well as an inexpensive stock material for the fabrication of the device. In the practice of the invention, numerous changes, modifications and the full use of equivalents may be resorted to without departure from the spirit or scope of the following claims.

I claim:

1. A fan assembly including a frame defining an air passage, tubular opposed supporting brackets having central straight parallel portions and radiating arms extending therefrom connected to said frame, a fan shaft bearing housing having a pair of opposed housing elements, a fan shaft rotatably mounted in said housing between said housing elements, a fan mounted on said shaft for causing the flow of air through said air passage, means connecting said housing between the straight parallel portions of said brackets to support the housing from said frame, said means including bracket receiving formations on said housing elements, bolts connected through said straight portions to retain said portions in said formations and for urging said elements together, and flanges on said housing receiving the bolts therethrough.

2. A multi-part fan shaft bearing housing including a pair of complementary elongate housing elements of generally semicircular cross section, longitudinally extending flanges projecting from the sides of said elements, said elements and said flanges being formed of flat sheet metal, and means permanently uniting said flanges to form a tubular housing, said housing defining circular end bearing receiving mouths, and a rectangular intermediate portion having opposite side walls parallel with said flanges which define transverse recesses for the reception of supporting brackets.

3. A fan shaft bearing housing and support assembly including a tubular bearing housing comprising a pair of complementary opposed elements having an intermediate rectangular sector defining a transverse recess, upper and lower supporting brackets including spaced parallel straight intermediate portions, one of said portions seated within said recess of each of said elements, and means urging said portions together for urging said elements of said housing together.

4. A fan shaft bearing housing and support assembly including a tubular bearing housing comprising an intermediate rectangular sector defining transverse recesses, said housing being formed of separate complementary housing elements of sheet metal permanently joined to form an integral structure, upper and lower supporting brackets including spaced parallel straight intermediate portions seated within said recesses, and means clamping said portions to said housing, said means including bolts extending through both of said brackets and said housing and urging the elements of said housing together.

5. A fan assembly comprising a frame defining an air passage therethrough, opposed tubular supporting brackets having parallel central portions and diverging arms, flat portions integrally formed at the ends of said brackets, bolts passing through said flat portions for securing said flat portions to said frame, a bearing housing between said parallel portions of said supporting brackets, said bearing housing including a pair of housing elements of generally semicircular cross section, longitudinally extending flanges projecting from the sides of said elements, means uniting said flanges to form a tubular housing, rectangular intermediate portions having opposite side walls substantially parallel with said flanges, there being provided in said rectangular intermediate portions transverse recesses receiving the parallel portions of said supporting brackets, spaced axially aligned bearings within said housing, a shaft journalled by said bearings, a fan mounted on said shaft, means for rotating said shaft, and clamping means urging said parallel portions of said brackets together to urge said elements together.

6. The structure defined in claim 5 wherein said clamping means includes a pair of bolts passing through said supporting brackets on opposite sides of said housing.

References Cited in the file of this patent

UNITED STATES PATENTS

| | | |
|---|---|---|
| 1,050,177 | Seaman | Jan. 14, 1913 |
| 1,198,103 | Budlong | Sept. 12, 1916 |
| 1,249,431 | Liebermann | Dec. 11, 1917 |
| 1,358,444 | Helmstaedter | Nov. 9, 1920 |
| 1,823,521 | Ackerman et al. | Sept. 15, 1931 |
| 2,573,145 | Sprouse | Oct. 30, 1951 |
| 2,580,119 | Meyers | Dec. 25, 1951 |
| 2,621,850 | Firth | Dec. 16, 1952 |
| 2,643,053 | Sherman | June 23, 1953 |
| 2,666,478 | Shwayder | Jan. 19, 1954 |
| 2,700,500 | Wren | Jan. 25, 1955 |